US008918996B2

(12) United States Patent
Wessman et al.

(10) Patent No.: US 8,918,996 B2
(45) Date of Patent: Dec. 30, 2014

(54) COMPONENTS AND PROCESSES OF PRODUCING COMPONENTS WITH REGIONS HAVING DIFFERENT GRAIN STRUCTURES

(75) Inventors: Andrew Ezekiel Wessman, Walton, KY (US); David Paul Mourer, Beverly, MA (US)

(73) Assignee: General Electric Company, Schenectady, NY (US)

( * ) Notice: Subject to any disclaimer, the term of this patent is extended or adjusted under 35 U.S.C. 154(b) by 660 days.

(21) Appl. No.: 13/100,364

(22) Filed: May 4, 2011

(65) Prior Publication Data

US 2012/0279067 A1    Nov. 8, 2012

(51) Int. Cl.
*B21K 25/00* (2006.01)
*C22F 1/10* (2006.01)
*B23K 35/30* (2006.01)
*C22C 19/03* (2006.01)

(52) U.S. Cl.
CPC .............. *C22F 1/10* (2013.01); *B23K 35/3033* (2013.01); *C22C 19/03* (2013.01)
USPC ........ 29/889.2; 29/889.23; 148/675; 148/564

(58) Field of Classification Search
USPC .......... 148/400, 527, 675; 228/265; 29/889.2; 416/212 A, 212 R
See application file for complete search history.

(56) References Cited

U.S. PATENT DOCUMENTS

| | | | |
|---|---|---|---|
| 3,576,681 A | 4/1971 | Barker et al. | |
| 4,063,939 A * | 12/1977 | Weaver et al. | 419/5 |
| 4,479,293 A * | 10/1984 | Miller et al. | 29/889.23 |
| 4,820,358 A | 4/1989 | Chang | |
| 4,957,567 A | 9/1990 | Krueger et al. | |
| 5,100,050 A | 3/1992 | Krueger et al. | |
| 5,106,012 A | 4/1992 | Hyzak et al. | |
| 5,161,950 A * | 11/1992 | Krueger et al. | 416/204 R |
| 5,527,020 A | 6/1996 | Ganesh et al. | |
| 5,527,402 A | 6/1996 | Ganesh et al. | |
| 6,478,896 B1 | 11/2002 | Ganesh et al. | |
| 6,521,175 B1 | 2/2003 | Mourer et al. | |
| 6,969,238 B2 * | 11/2005 | Groh et al. | 416/213 R |
| 2008/0120842 A1 | 5/2008 | Wines et al. | |
| 2008/0124210 A1 | 5/2008 | Wayte et al. | |
| 2009/0000706 A1 * | 1/2009 | Huron et al. | 148/556 |
| 2010/0215978 A1 * | 8/2010 | Rice | 428/577 |

* cited by examiner

*Primary Examiner* — Jacob Cigna (74) *Attorney, Agent, or Firm* — General Electric Company; Brian P. Overbeck (57) ABSTRACT

Processes for fabricating components to have two or more regions with different grain structures, and components produced by such processes. First and second preforms are fabricated to comprise interface surfaces at which the preforms can be joined together. The first and second preforms are formed of first and second precipitation-strengthened alloys, respectively, and the first alloy differs from the second alloy by having a higher solvus temperature or a higher grain refiner content. The preforms are joined together to form an article comprising first and second portions formed by the first and second preforms, respectively, and corresponding to first and second regions of the component, respectively, and the interface surfaces of the preforms form a joint between the first and second portions of the article. A supersolvus heat treatment is performed on the article so that greater grain growth occurs in the second portion than in the first portion.

13 Claims, 5 Drawing Sheets

ABOVE US 8,918,996 B2

COMPONENTS AND PROCESSES OF PRODUCING COMPONENTS WITH REGIONS HAVING DIFFERENT GRAIN STRUCTURES

BACKGROUND OF THE INVENTION

The present invention generally relates to processes for producing components having regions with different microstructures. More particularly, this invention is directed to a technique for producing components, as an example, rotating components of a turbomachine, from preforms having different compositions. The preforms are joined and heat treated to yield different microstructures within regions of the component defined by the joined preforms.

Components within the combustor and turbine sections of a gas turbine engine are often formed of superalloy materials in order to achieve acceptable mechanical properties while at elevated temperatures resulting from the hot combustion gases produced in the combustor. Higher compressor exit temperatures in modern high pressure ratio gas turbine engines can also necessitate the use of high performance superalloys for compressor components, including blades, spools, disks (wheels) and other components. Suitable alloy compositions and microstructures for a given component are dependent on the particular temperatures, stresses, and other conditions to which the component is subjected. For example, rotating hardware such as turbine disks and compressor spools and disks are typically formed of alloys that must undergo carefully controlled forging, heat treatments, and surface treatments to produce a controlled grain structure and desirable mechanical properties. Notable examples of alloys used in these applications include gamma prime (γ') precipitation-strengthened nickel-base superalloys containing chromium, tungsten, molybdenum, rhenium and/or cobalt as principal elements that combine with nickel to form the gamma (γ) matrix, and contain aluminum, titanium, tantalum, niobium, and/or vanadium as principal elements that combine with nickel to form the gamma prime precipitate strengthening phase, principally Ni$_3$(Al,Ti). Particular examples of gamma prime nickel-base superalloys include René 88DT (R88DT; U.S. Pat. No. 4,957,567), René 95 (R95; U.S. Pat. No. 3,576,681), and René 104 (R104; U.S. Pat. No. 6,521,175), as well as certain nickel-base superalloys commercially available under the trademarks Inconel®, Nimonic®, and Udimet®. Disks and other critical gas turbine engine components are often forged from billets produced by powder metallurgy (P/M), conventional cast and wrought processing, and spraycast or nucleated casting forming techniques. Forging is typically performed on fine-grained billets to promote formability, after which a supersolvus heat treatment is often performed to cause uniform grain growth (coarsening) to optimize properties.

Figure 1:
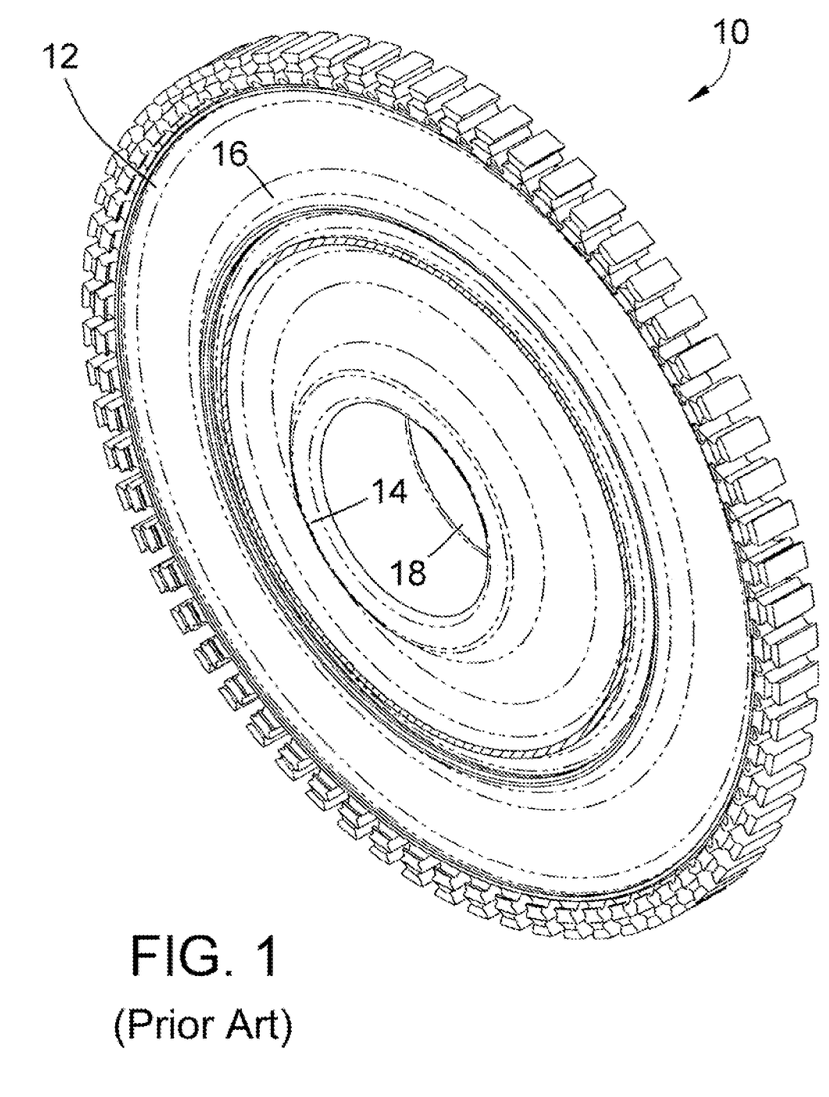
FIG. 1 is a perspective view of a turbine disk of a type used in gas turbine engines.

A turbine disk 10 of a type known in the art is represented in FIG. 1. The disk 10 generally includes an outer rim 12, a central hub or bore 14, and a web 16 between the rim 12 and bore 14. The rim 12 is configured for the attachment of turbine blades (not shown) in accordance with known practice. A bore hole 18 in the form of a through-hole is centrally located in the bore 14 for mounting the disk 10 on a shaft, and therefore the axis of the bore hole 18 coincides with the axis of rotation of the disk 10. The disk 10 is presented as a unitary forging and representative of turbine disks used in aircraft engines, including but not limited to high-bypass gas turbine engines such as the GE90® and GEnx® commercial engines manufactured by the General Electric Company.

The bore 14 and web 16 of the turbine disk 10 (as well as those of compressor spools and disks) generally have lower operating temperatures than the rim 12. It is therefore permissible and often desirable that the bore 14 have different properties than the rim 12. Depending on the particular alloy or alloys used, optimal microstructures for the rim 12, bore 14 and web 16 can also differ. For example, a relatively fine grain size is often optimal for the bore 14 and web 16 to promote tensile strength, burst strength, and resistance to low cycle fatigue (LCF), while a coarser grain size is often optimal in the rim 12 to promote creep, stress-rupture, and crack growth resistance, for example, low dwell (hold-time) fatigue crack growth rates (DFCGR) at high temperatures. To satisfy these competing requirements, disks have been proposed that are formed of multiple alloys and/or have different microstructures within the rim and bore. For example, U.S. Pat. Nos. 4,820,358, 5,527,020, 5,527,402 and 6,478,896 disclose dual heat treatment techniques capable of producing single-piece, constant-composition disks having coarser grains within the rim and finer grains with the bore as a result of performing heat treatments at different temperatures on the rim and bore, thereby obtaining the different grain structures and resulting different properties.

Multiple alloy disks that have been investigated typically entail the fabrication of separate rim and bore portions formed of different alloys. The rim and bore portions are then joined together, such as by welding or another metallurgical joining process. One such example is known as forge-enhanced bonding which, as disclosed in U.S. Pat. Nos. 5,100,050, 5,106,012 and 5,161,950, entails simultaneously forging preforms of the rim and bore. During the forging operation, deformation of the preforms yields the rim and bore as well as results in metallurgical joining of the rim and bore. Another example is solid-state welding processes, which include inertia welding techniques of the types disclosed in U.S. Pat. No. 6,969,238 and U.S. Published Patent Application Nos. 2008/0120842 and 2008/0124210. Because the different alloys may have different solvus temperatures such that the alloys are not conducive to a common solution heat treatment cycle, inertia welding has been limited to joining solution heat treated rim and bore portions, which are then subjected to an aging cycle after the welding operation.

Even with the advancements outlined above, in practice current certified commercial flight turbine disks have only been produced as monolithic structures formed by a single alloy and processed to have a uniform microstructure whose grain size is necessarily a compromise between the creep, stress-rupture and DFCGR properties desired for the rim and the LCF and burst properties desired for the bore.

BRIEF DESCRIPTION OF THE INVENTION

The present invention provides processes for fabricating components to have two or more regions with different grain structures, and components produced by such processes. Nonlimiting examples include rotating components of turbomachines, including turbine disks of gas turbine engines.

According to a first aspect of the invention, a process entails fabricating first and second preforms that individually correspond to first and second regions of a desired component. Each of the first and second preforms comprises an interface surface at which the first and second preforms can be joined together. The first and second preforms are formed of first and second precipitation-strengthened alloys, respectively, and the first precipitation-strengthened alloy differs from the second precipitation-strengthened alloy by having a higher solvus temperature or a higher grain refiner content of at least one grain-refining element. The first and second preforms are joined together to form an article comprising first and second portions formed by the first and second preforms, respectively, and corresponding to the first and second regions of the component, respectively, and so that the interface surfaces of the first and second preforms form a solid-state joint located between the first and second portions of the article. A supersolvus heat treatment is then performed on the article so that greater grain growth occurs in the second portion than in the first portion.

According to a particular aspect of the invention, if the first precipitation-strengthened alloy has a higher solvus temperature than the second precipitation-strengthened alloy, then the supersolvus heat treatment heats the article to a temperature above the solvus temperature of the second precipitation-strengthened alloy of the second portion but not above the solvus temperature of the first precipitation-strengthened alloy of the first portion. According to another particular aspect of the invention, if the first precipitation-strengthened alloy has a higher grain refiner content than the second precipitation-strengthened alloy, then the supersolvus heat treatment heats the article to a temperature above the solvus temperatures of the first and second precipitation-strengthened alloys of the first and second portions.

According to another aspect of the invention, a process of fabricating a turbine disk of a gas turbine engine entails fabricating first and second preforms individually corresponding to a bore and a rim of the disk. Each of the first and second preforms comprises an interface surface at which the first and second preforms can be joined together. The first and second preforms are formed of first and second gamma prime-strengthened nickel-base superalloys, respectively, and the first gamma prime-strengthened nickel-base superalloy differs from the second gamma prime-strengthened nickel-base superalloy by having a higher gamma-prime solvus temperature or a higher grain refiner content of at least one grain-refining element. The first and second preforms are joined together to form an article comprising first and second portions formed by the first and second preforms, respectively, and corresponding to the rim and the bore of the disk, respectively. In addition, the interface surfaces of the first and second preforms form a solid-state joint located between the first and second portions of the article and corresponding to a web of the disk interconnecting the rim and the bore. A supersolvus heat treatment is then performed on the article so that greater grain growth occurs in the second portion than in the first portion, the bore has an average grain size of ASTM 8 or smaller, and the rim to have an average grain size of ASTM 7 or larger. If the first gamma prime-strengthened nickel-base superalloy has a higher gamma-prime solvus temperature than the second gamma prime-strengthened nickel-base superalloy, then the supersolvus heat treatment heats the article to a temperature above the gamma-prime solvus temperature of the second gamma prime-strengthened nickel-base superalloy but not above the gamma-prime solvus temperature of the first gamma prime-strengthened nickel-base superalloy. If the first gamma prime-strengthened nickel-base superalloy has a higher grain refiner content than the second gamma prime-strengthened nickel-base superalloy, then the supersolvus heat treatment heats the article to a temperature above the gamma-prime solvus temperatures of the first and second gamma prime-strengthened nickel-base superalloys.

Other aspects of the invention include components formed by one of the processes comprising the steps described above.

A technical effect of the invention is the ability to produce a component having two or more regions with different properties, including different grains sizes so that the different regions of the component can have grain sizes that promote different properties. In terms of a turbine disk, the process can produce a disk to have finer grains in the bore and coarser grains in the rim, enabling the properties of the rim and bore to be tailored or otherwise better adapted for the different operating conditions of the rim and bore. Another effect of the invention is the ability to produce the rim and bore from different alloys having significantly different solvus temperatures and/or properties, or from alloys that differ only in the amounts of grain-refining elements they contain. The process of this invention can potentially be applied to a wide variety of alloys, heat treatments, and forging conditions to achieve different grain sizes and structures within different regions of a component.

Other aspects and advantages of this invention will be better appreciated from the following detailed description.

DETAILED DESCRIPTION OF THE INVENTION

The present invention will be described with reference to rotating hardware of the type used in turbomachines, and particularly turbine and compressor disks and compressor spools of high-bypass gas turbine engines. However, though it should be understood that the teachings and benefits of the invention are not limited to such hardware, and instead can be adapted and applied to hardware used in a wide range of applications. For convenience, the invention will be described in particular reference to the turbine disk 10 represented FIG. 1, though it should be understood that the teachings and benefits of the invention are not limited to this particular disk 10.

Figure 2:
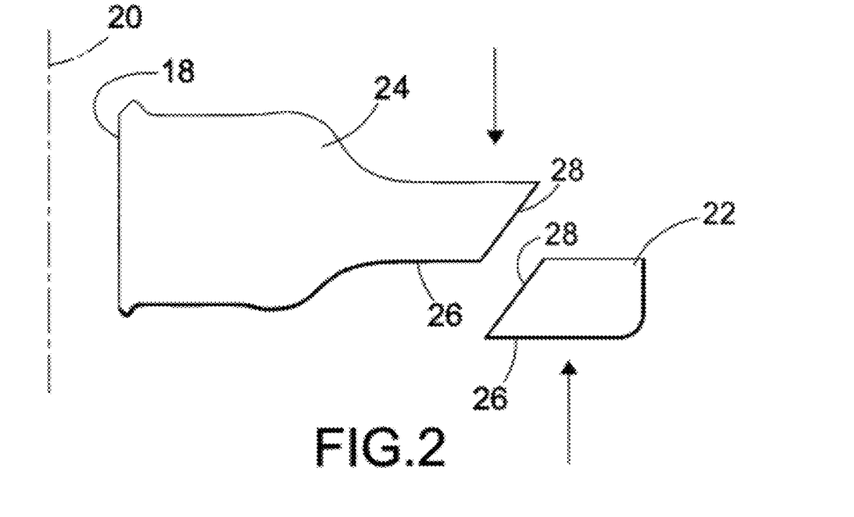
FIG. 2 represents the fabrication of a dual-alloy turbine disk by inertia welding a rim preform to a bore preform.
Figure 3:
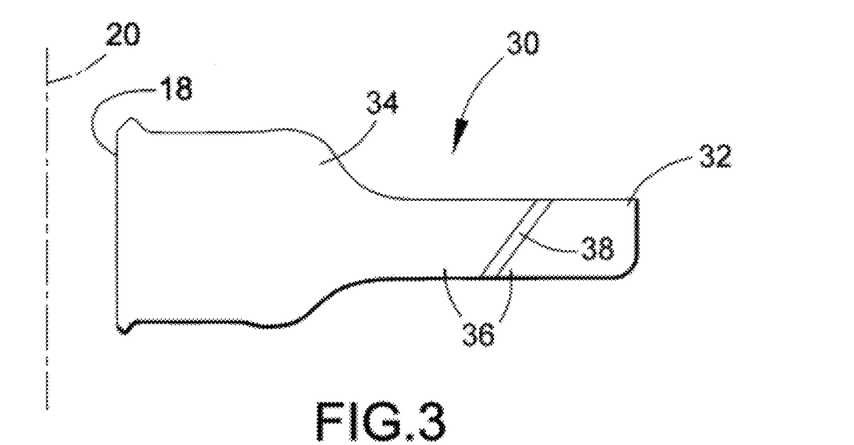
FIG. 3 represents the resulting turbine disk profile in accordance with an embodiment of the present invention.
Figure 4:
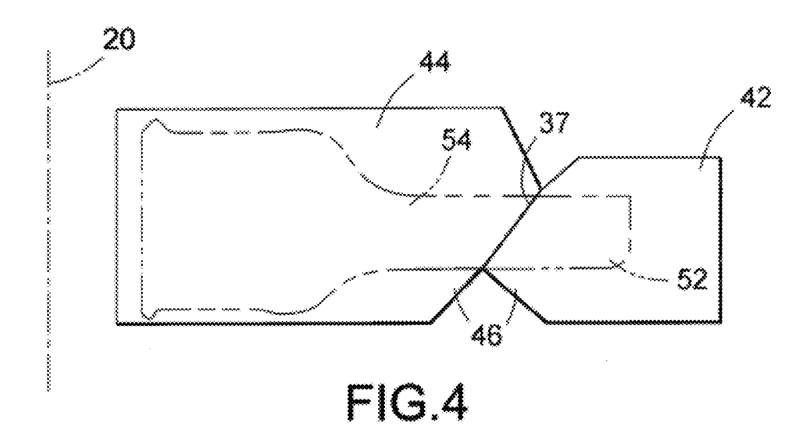
FIG. 4 represents rim and bore preforms for fabricating a dual-alloy turbine disk.
Figure 5:
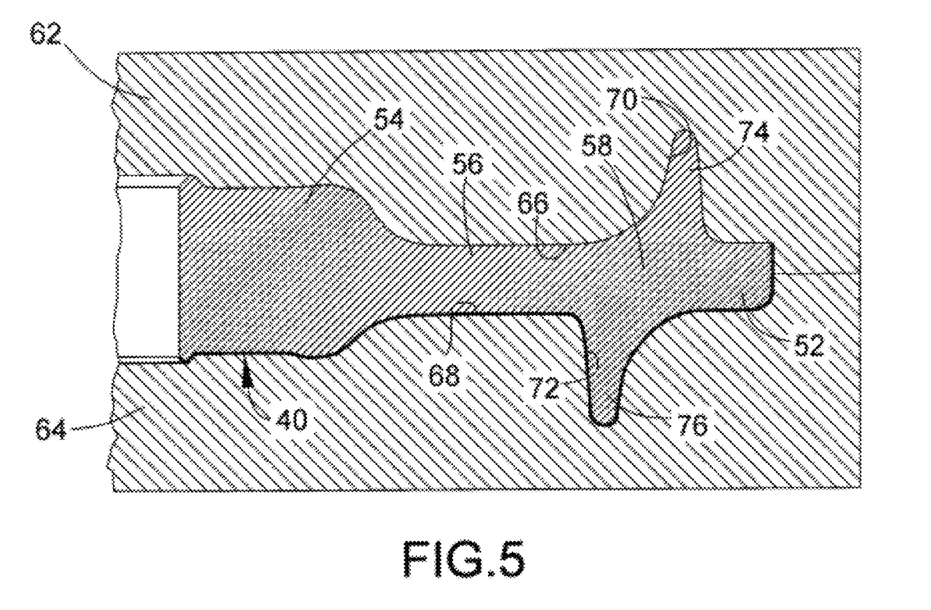
FIG. 5 is a cross-sectional view representing a forge-enhanced bonding technique performed on the preforms of FIG. 4 to yield a forging.

FIG. 2 represents a step involved in fabricating the disk 10 using an inertia welding technique, and FIGS. 4 and 5 represent steps involved in fabricating the disk 10 using a forge-enhanced bonding technique. Both processes entail preparing a separate rim preform 22 or 42 and bore preform 24 or 44, which then undergo a joining process, such as the inertia welding technique of FIG. 2 to yield a welded profile 30, represented in FIG. 3 as having rim, bore and web portions 32, 34 and 36, respectively, and a solid-state joint 38, or undergo the forge-enhanced bonding technique of FIGS. 4 and 5 to yield a forged profile 50, represented in FIG. 6 as having rim, bore and web portions 52, 54 and 56, respectively, and a solid-state joint 58. The processes and profiles 30 and 50 represented in FIGS. 2 through 6 are intended to be nonlimiting, since it is foreseeable that other techniques could be employed to metallurgically join the preforms 22, 44, 32 and 44, as well as combinations of various techniques. In any case, the rim preform 22/42 is formed from an alloy that is different than the alloy from which the bore preform 24/44 is formed. The alloys used to form the preforms 22, 24, 42 and 44 are preferably strengthened with a precipitation phase that can be solutioned during processing of the alloys. In the context of forming the turbine disk 10, preferred alloys for the preforms 22, 24, 42 and 44 are gamma prime precipitation-strengthened nickel-base alloys. In all cases, the alloys for the preforms 22, 24, 42 and 44 are chosen on the basis of the operating conditions to which the final product will be subjected. As such, alloys for the rim preforms 22 and 42 are chosen on the basis of the operating conditions of the rim 12 and alloys for the bore preforms 24 and 44 are chosen on the basis of the operating conditions of the bore 14 when the disk 10 is installed in a turbomachine, such as a gas turbine engine. Additionally the bore and rim alloys may be chosen in part based on their responses to the processes used to manufacture the preforms 22, 24, 42 and 44, or based on the characteristics of their responses to joining processes and the mechanical behavior of their respective joints 38 and 58. Nonlimiting examples of suitable materials include the aforementioned gamma prime nickel-base superalloys R88DT, R95 and R104, as well as certain nickel-base superalloys commercially available under the trademarks Inconel®, Nimonic®, and Udimet®.

Because the resulting rim 12 and bore 14 are produced from different alloys, the disk 10 can be termed a multi-alloy component whose rim 12 and bore 14 can be formed of materials better tailored for different operating conditions to which the rim 12 and bore 14 are subjected. Also, as will be noted below, the rim preforms 22 and 42 and bore preforms 24 and 44 can be produced from alloys that are sufficiently different to enable the resulting profiles 30 and 50 to respond to a mono-temperature solution heat treatment with different grain growth responses. However, it is within the scope of the invention that different solution heat treatments could be performed on regions of the profiles 30 and 50 corresponding to the rim 12 and bore 14 of the disk 10. It is also within the scope of the invention that preforms could be produced for additional regions of the disk 10, for example, the web 16, to achieve desired microstructures between the bore 14 and rim 12.

With reference to the inertia welding technique of FIGS. 2 and 3, FIG. 2 represents portions of the rim preform 22 and bore preform 24 in cross-section. It should be appreciated that, because of the axisymmetric configuration of the disk 10, there are diametrically opposite portions of preforms 22 and 24 that are not shown in FIG. 2. The preforms 22 and 24 can be produced by a variety of known processes, including billets produced by powder metallurgy (P/M), conventional cast and wrought processing, and spraycast or nucleated casting forming techniques. The preforms 22 and 24 preferably have an average grain size of about ASTM 6 to about 9, which is a suitable range for providing acceptable LCF properties in the bore 14 while allowing for grain growth in the rim 12 that is capable of promoting creep properties. FIG. 2 illustrates that the rim and bore preforms 22 and 24 can be forged or otherwise fabricated prior to inertia welding to produce the disk profile 30 of FIG. 3, which closely corresponds to the desired geometries of the rim 12, bore 14 and web 16 in the final disk 10.

The preforms 22 and 24 are shown in FIG. 2 as having two machined interface surfaces 28 at which joining occurs by inertia welding. The surfaces 28 are located within regions 26 of the preforms 22 and 24 corresponding to the web 16 of the disk 10, such that the resulting weld joint (38 in FIG. 3) will be located in the web 16 of the disk 10. The interface surfaces 28 are further represented as being oriented at an angle to the axis 20 of the eventual disk 10, providing a contact (draft) angle that facilitates assembling and mating of the annular-shaped rim preform 22 within the bore preform 24, as indicated by the arrows in FIG. 2. Consequently, the resulting weld joint 38 shown in FIG. 3 is also inclined at the same angle. However, it is foreseeable that the interface surfaces 28 of the rim and bore preforms 22 and 24 could vary from that illustrated and, in fact, be parallel to the disk axis 20. To further facilitate assembly and contact between the preforms 22 and 24, the surfaces 28 are preferably conformably shaped so that they readily slide into contact with each other.

The inertia welding process represented by FIG. 2 is a solid-state welding technique accomplished by rotating the rim preform 22 and/or bore preform 24 about the disk axis 20. As a matter of convenience, the rim preform 22 may be held stationary and the bore preform 24 rotated. While relative rotation is occurring, the rim and bore preforms 22 and 24 are moved together parallel to the axis 20 until their interface surfaces 28 come in contact. As relative rotation continues, the contacting surfaces 28 generate frictional heating, and increasing the application of force in the axial direction increases the temperatures of the regions underlying the surfaces 28 of the rim and bore preforms 22 and 24 to a temperature approaching the incipient melting temperatures of the materials from which the preforms 22 and 24 are made. The axial force, relative rotational speeds and input rotational energy at initiation of welding, and required relative displacements necessary to inertia weld the preforms 22 and 24 will vary, depending on the size, mass and materials of the preforms 22 and 24 and the surface area of their interface surfaces 28. The preforms 22 and 24 are held in contact under these conditions for a period of time sufficient to cause them to bond together along their contacting surfaces 28 as the rotational speed decays to zero, forming the solid-state weld joint 38 that contains fine-grained material as a result of the temperatures sustained during inertia welding. FIG. 3 represents the resulting profile 30 as having a rim portion 32, bore portion 34 and web portion 36 that closely correspond to the desired geometries of the rim 12, bore 14 and web 16, respectively, in the final disk 10.

Figure 6:
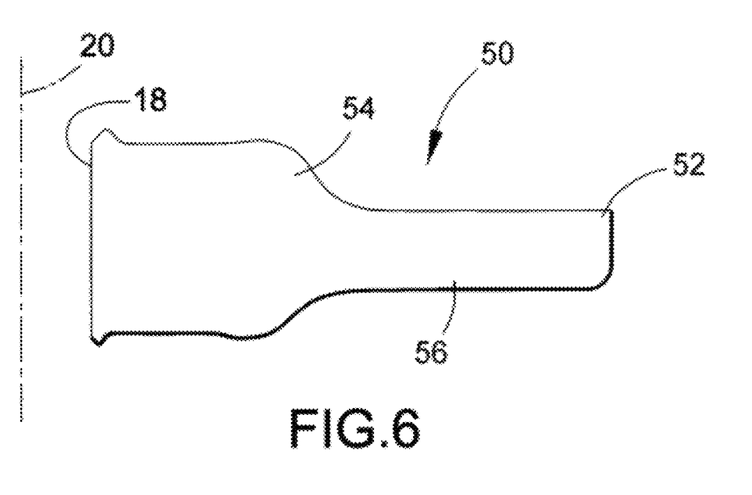
FIG. 6 represents a turbine disk profile produced from the forging of FIG. 5 in accordance with another embodiment of the present invention.

With reference to the forge-enhanced bonding technique of FIGS. 4 through 6, FIG. 4 represents portions of the rim preform 42 and bore preform 44 in cross-section. Again, it should be appreciated that, because of the axisymmetric configuration of the disk 10, there are diametrically opposite portions of the preforms 42 and 44 that are not shown in FIG. 4. The preforms 42 and 44 can be also produced by processes of the type identified for the preforms 22 and 34 of FIG. 2. For illustrative purposes, FIG. 4 depicts the outlines of the rim portion 52 and bore portion 54 of the resulting profile 50 of FIG. 6, which closely corresponds to the desired geometries of the rim 12, bore 14 and web 16 in the final disk 10.

The preforms 42 and 44 are shown in FIG. 4 as having two machined interface surfaces 48 located within regions 46 of the preforms 42 and 44 corresponding to the web 16 of the disk 10, such that the resulting solid-state joint (58 in FIG. 5) will be located in the web 16 of the disk 10. The interface surfaces 48 are further represented as being oriented at an angle to the axis 20 of the eventual disk 10, with the result that the joint 58 is also inclined at the same angle. However, it is foreseeable that the interface surfaces 48 of the rim and bore preforms 42 and 44 could be parallel to the disk axis 20. To further facilitate assembly and contact between the preforms 42 and 44, the surfaces 48 are preferably conformably shaped to promote uniform contact therebetween.

The preforms 42 and 44 are placed in dies 62 and 64 of a forge press to yield the forging 40 represented in FIG. 5. Suitable forging conditions will depend on the particular materials and sizes of the preforms 42 and 44 and are generally within the knowledge and capability of those skilled in the art, particularly in view of the teachings of U.S. Pat. Nos. 5,100,050, 5,106,012 and 5,161,950, and therefore will not be discussed in any detail here. The cavities 66 and 68 of the dies 62 and 64 substantially define the shape of the profile 50 everywhere except at the interface surfaces 48 and, therefore, the joint 58 within the forging 40. FIG. 5 represents the result of the forging operation, during which material flows from the interface surfaces 48 into cavities or vents 70 and 72 of the dies 62 and 64. The vents 70 and 72 are represented as coaxial but having different diameters, so that the vents 70 and 72 are not axially aligned in the axial direction of the disk axis 20 but instead are radially offset from each other. The offset is selected so that the material in the vicinity of the interface surfaces 48 of the preforms 42 and 44 will face one of the vents 70 and 72 when forging is initiated, and during forging will be displaced or expelled into the vents 70 and 72. A very large degree of metal flow and grain distortion intentionally occurs during forging within the material in the vicinity of the interface surfaces 48 of the preforms 42 and 44. Using a single or multiple strokes during the forging operation, this distortion is purged from the forging 40 into the vents 70 and 72, resulting in the creation of annular flanges 74 and 76. The flanges 74 and 76 are then removed during final machining of the forging 40 to produce the desired profile 50 shown in FIG. 6.

It is well known in the art that many nickel-base superalloys have preferred strain rate regimes to achieve desired supersolvus grain growth behavior. The forge-enhanced bonding technique described above (as well as other forging techniques) offers the necessary control capabilities to achieve these regimes in the region of the joint 58 to achieve a preferred grain growth. Adjustment of the geometries of the preforms 42 and 44 and their respective interface surfaces 48, along with forge process control, may be used to achieve the desired strain and strain rate profiles local to the joint 58 as well as throughout the entire forging 40. In one example, the method of joining could include an initial inertia welding step (for example, of the type described in reference to FIGS. 2 and 3). For certain alloys, the strain and strain rate patterns created by inertia welding would not achieve the desired regimes for preferred grain growth. The initial joining step could then be followed by a forging operation so that sufficient strain is induced in the preferred strain rate regime to dominate subsequent supersolvus grain growth behavior. The forging operation may be a forge-enhanced bonding technique similar to that described in reference to FIGS. 4 through 6, but with the oppositely-disposed edges of the weld joint 38 facing the vents 70 and 72 when forging is initiated so that portions of the weld joint 38 are displaced or expelled into the vents 70 and 72 during forging.

As previously discussed, a preferred aspect of the invention is to produce the disk 10 so that its rim 12 and bore 14 are formed of different compositions, and then heat treating the disk 10 to obtain a finer structure in the bore 14 and a coarser structure in the rim 12. In investigations leading up to the present invention, two approaches were evaluated.

A first of the approaches involved producing a profile (30 or 50) whose rim and bore portions (22/42 and 24/44) are separately formed and joined together, for example, using the inertia welding or forge-enhanced bonding techniques described above. The bore portion 24/44 is composed of a precipitation-strengthened alloy having a solvus temperature significantly higher than that of the rim portion 22/42. For example, the rim and bore portions 22/42 and 24/44 are formed of two gamma prime precipitation-strengthened nickel-base superalloys, and the gamma prime precipitation-strengthened nickel-base superalloy of the bore portion 24/44 has a gamma prime solvus temperature at least 10° C. higher and more preferably at least 25° C. higher than the gamma prime precipitation-strengthened nickel-base superalloy of the rim portion 22/42. The profile 30/50 is then heat treated at a solution heat treat temperature higher than solvus temperature of the alloy within the rim portion 22/42, but lower than the solvus temperature of alloy within the bore portion 24/44. This creates a disk 10 having a subsolvus heat treated bore 14 having a fine-grained microstructure that promotes its tensile strength, burst strength, and LCF resistance, and a supersolvus heat treated rim 12 having a coarser grain size that promotes its creep, stress-rupture, and crack growth resistance, for example, DFCGR.

The second approach involved producing a profile (30 or 50) whose rim and bore portions (22/42 and 24/44) are again separately formed and joined together, for example, using the inertia welding or forge-enhanced bonding techniques described above. As with the first approach, the rim and bore portions 22/42 and 24/44 are composed of precipitation-strengthened alloys, for example, two gamma prime precipitation-strengthened nickel-base superalloys. However, with the second approach the two alloys are not required to have different solvus temperatures, and instead they may have the same solvus temperature or their solvus temperatures may be within 25° C. of each other. Instead, the rim and bore portions 22/42 and 24/44 may have substantially the same composition, but the alloy for the bore portions 24/44 is alloyed to contain a greater amount of one or more minor elements capable of having a grain-refinement effect. Two notable examples are carbon or boron, though the use of other grain refiners is also foreseeable. As particular but nonlimiting examples, the alloy for the bore portion 24/44 may contain at least 0.1 weight percent of carbon, while the alloy for the rim portion 22/42 may contain less than 0.06 weight percent of carbon. Because the alloys for the rim and bore portions 22/42 and 24/44 are only required to differ in terms of their grain refiner contents, the alloy for the bore portion 24/44 can be produced by modifying the alloy of the rim portion 22/42 to contain an additional quantity of one or more grain-refining elements. It is also within the scope of the invention to process the bore portion 24/44 so that one or more limited portions thereof contain a greater amount of one or more minor elements so that the desired grain-refinement effect occurs within the portion(s) containing the higher levels of grain refiner(s). For example, grain refiners could be locally added by a surface treatment such as carburizing, ion implantation, etc., performed prior to heat treatment. As a result, only the surface portion(s) receiving the surface treatment and surface regions beneath the surface portion(s) would contain the higher grain refiner content.

The profile 30/50 is then heat treated at a solution heat treat temperature higher than the solvus temperature(s) of the alloys within the rim portion 22/42 and bore portion 24/44. Due to the grain refinement effect of the grain refining element(s), whose higher content in the bore portion 24/44 restricts grain growth within the bore portion 24/44 more than within the rim portion 22/42, the resulting disk 10 has a supersolvus heat treated rim 12 having coarse-grained microstructure that promotes its creep, stress-rupture, and crack growth resistance (for example, DFCGR) and a supersolvus heat treated bore 14 having a finer grain size that promotes its tensile strength, burst strength, and LCF resistance. Because a mono-temperature solution heat treatment can be used (in other words, the entire profile 30/50 is heated to a substantially uniform temperature), it is foreseeable that the solution heat treatment could be performed prior to joining the rim and bore portions 22/42 and 24/44, instead of after the joining operation.

Figure 7:
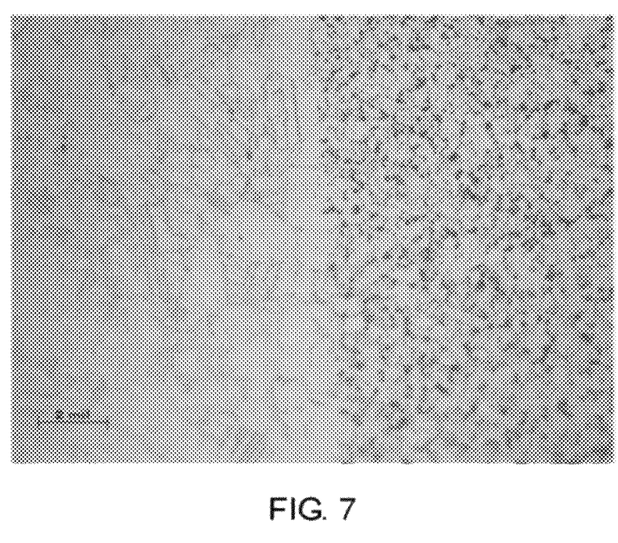
FIG. 7 is a microphotograph of a dual-alloy disk produced from two alloys having different solvus temperatures, and following a solution heat treatment at a temperature above only one of the two solvus temperatures in accordance with a particular aspect of the present invention.

In a first of the investigations, a disk was produced to have its rim formed of R88DT (U.S. Pat. No. 4,957,567) and its bore formed of R95 (U.S. Pat. No. 3,576,681). The gamma prime solvus temperature of R88DT is estimated to be about 1120° C. and the gamma prime solvus temperature of R95 is estimated to be about 1175° C. The disk was produced by forge-enhanced bonding as described above in reference to FIGS. 4 through 6. A mono-temperature heat treatment was performed at about 2100° F. (about 1150° C.) for about one hour, which was above the solvus temperature (supersolvus) of the R88DT alloy used to form the rim portion, but below the solvus temperature (subsolvus) of the R95 alloy used to form the bore portion. The result was a fine-grained bore having an average grain size of ASTM 10 and finer, and a coarser-grained rim portion having an average grain size of ASTM 7 and coarser. These grain sizes are advantageous in that the resulting bore had high yield strength for resistance to burst, whereas the rim would be resistant to crack growth rates. FIG. 7 is a microphotograph showing the microstructure of the dual-alloy disk, with the microstructure of R88DT seen on the left and the microstructure of R95 seen on the right in the image.

In a second investigation, two disks were produced to have rims and bores formed of alloys based on R104 (U.S. Pat. No. 6,521,175). The carbon content of the rim alloy was within the typical range of about 0.02-0.08% for the R104 alloy, whereas the R104 alloy of the bores was modified to have the higher carbon content. The disks were produced by inertia welding as described above in reference to FIGS. 2 and 3. One of the disks was produced by heat treating extruded preforms of the rim and bore followed by inertia welding, while the second disk was produced by inertia welding extruded preforms of the rim and bore followed by a heat treatment. In each case, the heat treatment was performed at about 2140° F. (about 1170° C.) for about one hour, which was above the essentially identical solvus temperatures (supersolvus) of the R104 alloys used to form the rim and bore portions.

Figure 8:
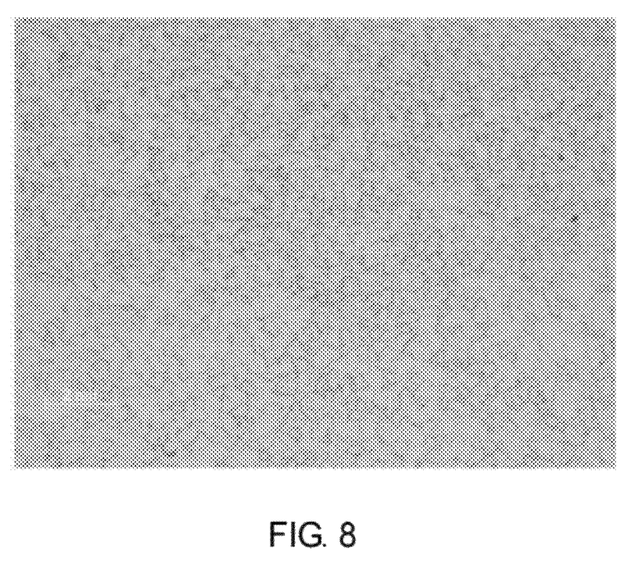
FIG. 8 is a microphotograph of a dual-alloy disk produced from two alloys differing only in their carbon contents, having essentially the same solvus temperature, and following a solution heat treatment at a temperature above their solvus temperature in accordance with another particular aspect of the present invention.

The microstructures within both welds were characterized by a noticeably finer grain structure on the higher-carbon bore side of the weld joints. The results were fine-grained bores and coarser-grained rims. A notable difference between the two weld joints was that the specimen produced from the preforms that were solution heat treated prior to welding experienced grain size refinement along the weld bond line, whereas the weld joint of the specimen produced by solution heat treating the profile after welding was characterized by grain growth along the weld bond line. Neither weld joint exhibited critical grain growth, which was believed to be attributable in part to the critical grain growth resistance exhibited by the R104 alloy and in particular the carbon content of the higher-carbon R104 alloy of the bore, which was concluded to have formed carbides that provided a grain boundary pinning effect. FIG. 8 is a microphotograph showing the microstructure of the dual-alloy disk, with the microstructure of the higher-carbon R104 alloy visible in the upper half of the image and the microstructure of the lower-carbon R104 alloy visible in the lower half in the image.

From the above, it can be appreciated that the alloys chosen for the rim 12 and bore 14 can be optimized via their major element chemistry composition to influence gamma-prime solvus composition and content, and their minor element chemistry composition to influence degree of grain refinement. In effect, the rim 12 and bore 14 can be produced from different alloys that enable or cause the final article to respond to controlled mono-temperature heat treatments to achieve different grain growth responses in the rim 12 and bore 14. However, it is also foreseeable that a dual heat treatment could be performed on the profiles 30 and 50, in which case the rim portion 32/52 and bore portion 34/54 are subjected to different supersolvus and/or different stabilization/aging temperatures to optimize grain size and properties within the rim 12 and bore 14. Examples of dual heat treatment techniques are disclosed in U.S. Pat. Nos. 4,820,358, 5,527,020, 5,527,402 and 6,478,896.

While the invention has been described in terms of a specific embodiment, it is apparent that other forms could be adopted by one skilled in the art. Therefore, the scope of the invention is to be limited only by the following claims.

The invention claimed is:

1. A process of fabricating a component having at least first and second regions with different grain structures, the process comprising:

providing first and second precipitation-strengthened alloys, the first precipitation-strengthened alloy differing from the second precipitation-strengthened alloy by having a higher grain refiner content of at least one grain-refining element, the first and second precipitation-strengthened alloys having solvus temperatures that are within 25° C. of each other;

fabricating first and second preforms individually corresponding to the first and second regions of the component, each of the first and second preforms comprising an interface surface at which the first and second preforms can be joined together, the first and second preforms being formed of the first and second precipitation-strengthened alloys, respectively;

joining the first and second preforms together to form an article comprising first and second portions formed by the first and second preforms, respectively, and corresponding to the first and second regions of the component, respectively, and so that the interface surfaces of the first and second preforms form a joint located between the first and second portions of the article; and then performing a supersolvus heat treatment on the article to cause greater grain growth in the second portion than in the first portion; and wherein the supersolvus heat treatment heats the article to a temperature above the solvus temperatures of the first and second precipitation-strengthened alloys.

2. The process according to claim 1, wherein the joining step comprises forging the first and second preforms together with dies to produce the article and form the joint as a solid-state joint, the dies defining first and second die cavities, at least one of the die cavities having a recess into which at least parts of the interface surfaces of the first and second preforms are expelled.

3. The process according to claim 1, wherein the joining step comprises inertia welding the first and second preforms together to produce the article and form the joint as a solid-state joint.

4. The process according to claim 1, wherein the joining step comprises:
inertia welding the first and second preforms together to produce the article and form the joint as a solid-state joint; and then
forging the article so that sufficient strain is induced in a strain rate regime to dominate subsequent supersolvus grain growth behavior of the article.

5. The process according to claim 1, wherein a composition of the first precipitation-strengthened ahoy solely differs from a composition of the second precipitation-strengthened alloy by having a higher grain refiner content of at least one grain-refining element.

6. The process according to claim 1, wherein the component is a turbine disk of a gas turbine engine, and the first and second regions of the component comprise a bore and a rim, respectively, of the turbine disk.

7. The process according to claim 6, wherein the bore has an average grain size of ASTM 8 or finer and the rim has an average grain size of ASTM 7 or coarser.

8. The process according to claim 1, wherein the first and second precipitation-strengthened alloys are gamma prime-strengthened nickel-base superalloys.

9. The process according to claim 8, wherein the fabricating step comprises producing the first precipitation-strengthened alloy by obtaining an additional quantity of the second precipitation-strengthened alloy and modifying the additional quantity by adding the at least one grain-refining element thereto.

10. The process according to claim 8, wherein the at least one grain-refining element is chosen from the group consisting of carbon and boron.

11. The process according to claim 10, wherein the first precipitation-strengthened alloy contains at least 0.1 weight percent of carbon and the second precipitation-strengthened alloy contains less than 0.06 weight percent of carbon.

12. A process of fabricating a turbine disk of a gas turbine engine, the process comprising:
fabricating first and second preforms individually corresponding to a bore and a rim of the disk, each of the first and second preforms comprising an interface surface at which the first and second preforms can be joined together, the first and second preforms being formed by forging first and second gamma prime-strengthened nickel-base superalloys, respectively, the first gamma prime-strengthened nickel-base superalloy differing from the second gamma prime-strengthened nickel-base superalloy by having a higher grain refiner content of at least one grain-refining element, the first and second gamma prime-strengthened nickel-base superalloys having solvus temperatures that are within 25° C. of each other;
joining the first and second preforms together to form an article comprising first and second portions formed by the first and second preforms, respectively, and corresponding to the rim and the bore of the disk, respectively, and so that the interface surfaces of the first and second preforms form a joint located between the first and second portions of the article and corresponding to a web of the disk interconnecting the rim and the bore; and then
performing a supersolvus heat treatment on all of the article so that greater grain growth occurs in the second portion than in the first portion, the bore has an average grain size of ASTM 8 or finer, and the rim to have an average grain size of ASTM 7 or coarser;
wherein the supersolvus heat treatment heats the article to a temperature above the gamma-prime solvus temperatures of the first and second gamma prime-strengthened nickel-base superalloys.

13. The process according to claim 12, wherein the fabricating step comprises performing a surface treatment on a surface portion of the first preform so that the at least one grain refining element is locally added to the first gamma prime-strengthened nickel-base superalloy and a region of the first preform beneath the surface portion contains the higher grain refiner content.

* * * * *

UNITED STATES PATENT AND TRADEMARK OFFICE
CERTIFICATE OF CORRECTION

PATENT NO. : 8,918,996 B2  
APPLICATION NO. : 13/100364  
DATED : December 30, 2014  
INVENTOR(S) : Wessman et al.

Page 1 of 1

It is certified that error appears in the above-identified patent and that said Letters Patent is hereby corrected as shown below:

IN THE CLAIMS
In Column 11, Line 14, in Claim 5, delete "ahoy" and insert -- alloy --, therefor.

Signed and Sealed this
Thirteenth Day of October, 2015

Michelle K. Lee
*Director of the United States Patent and Trademark Office*